D. W. PLAYER.
MOVING PICTURE APPARATUS.
APPLICATION FILED AUG. 25, 1914.

1,253,883.

Patented Jan. 15, 1918.

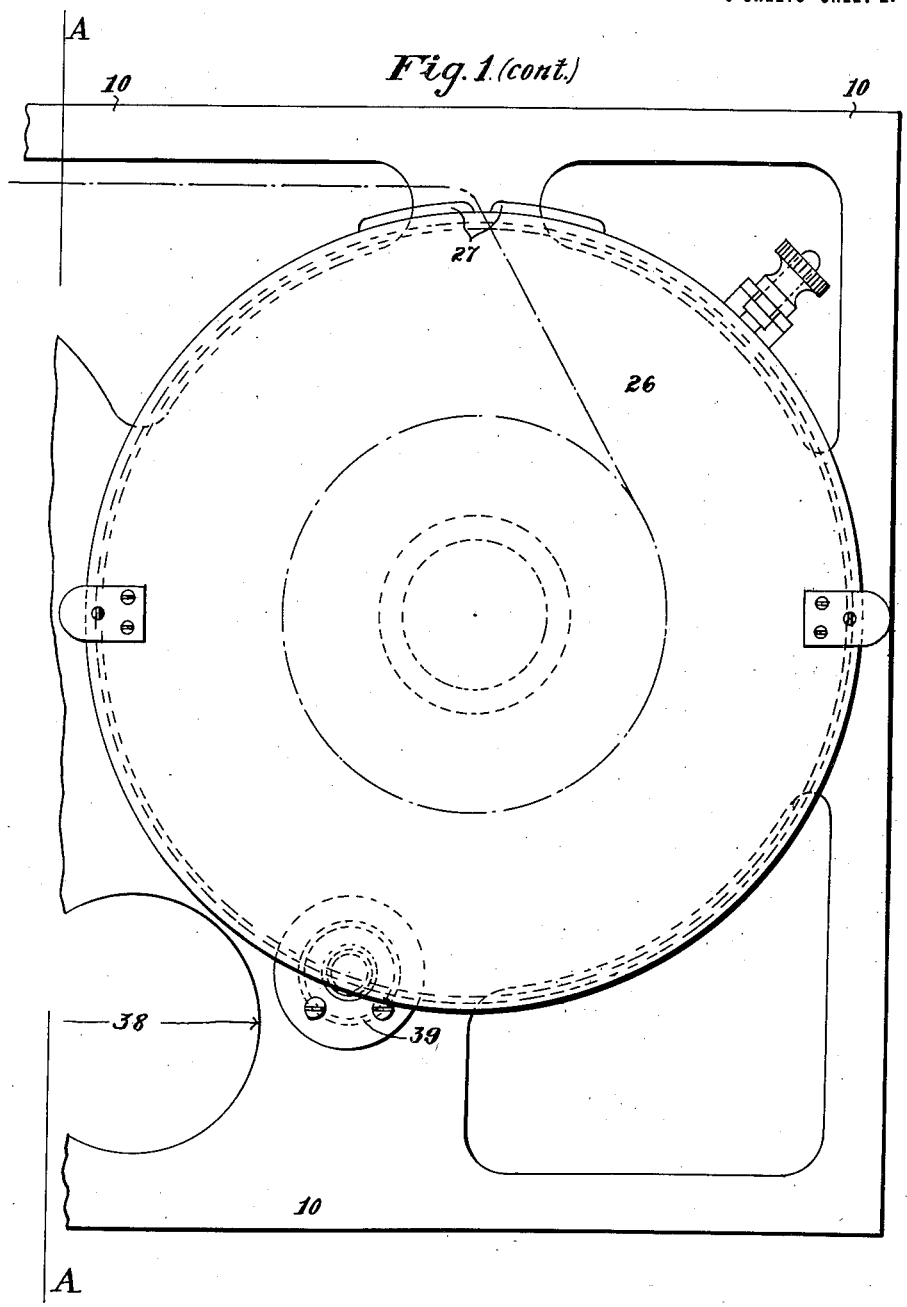

D. W. PLAYER.
MOVING PICTURE APPARATUS.
APPLICATION FILED AUG. 25, 1914.

1,253,883.

Patented Jan. 15, 1918.
6 SHEETS—SHEET 3.

Witnesses.
J. Manning
C. W. Fowler

Inventor.
Donald Willson Player.
By T. Walter Fowler
atty.

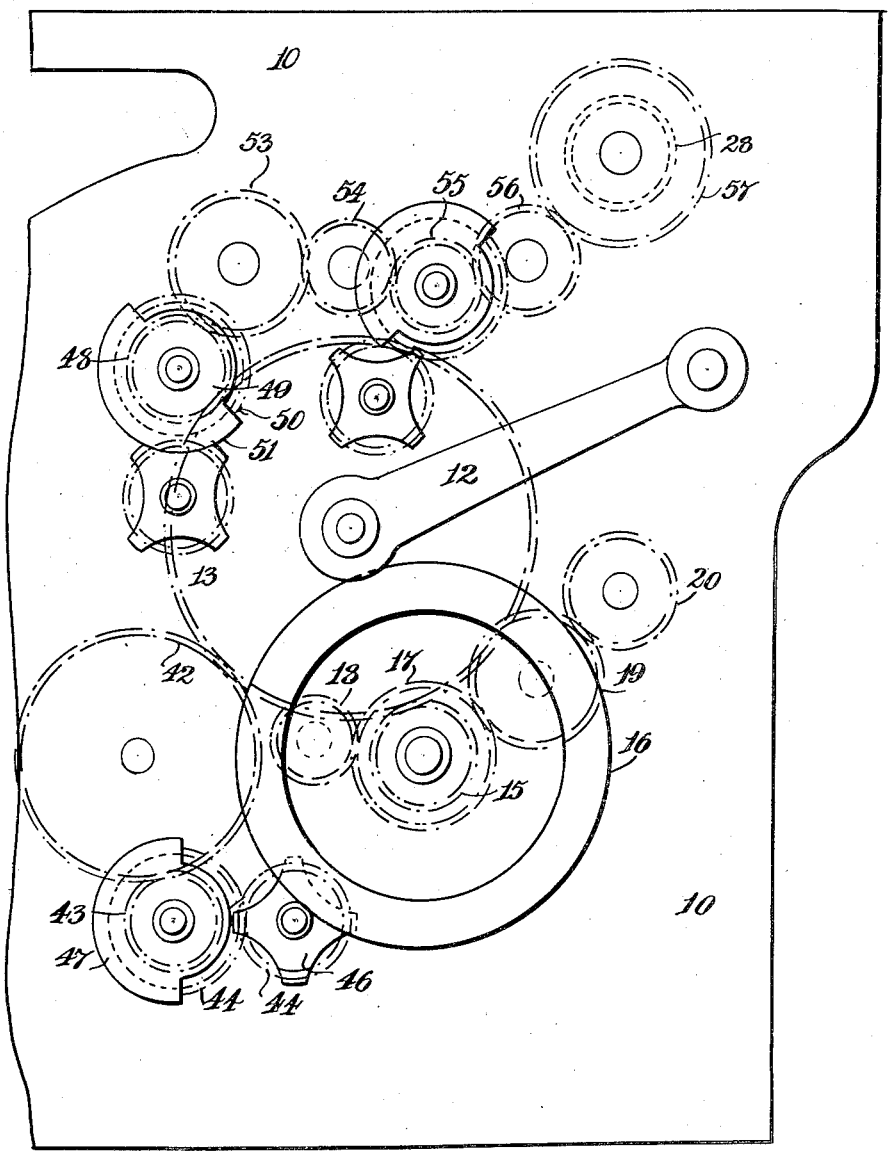

D. W. PLAYER.
MOVING PICTURE APPARATUS.
APPLICATION FILED AUG. 25, 1914.
1,253,883.
Patented Jan. 15, 1918.
6 SHEETS—SHEET 5.
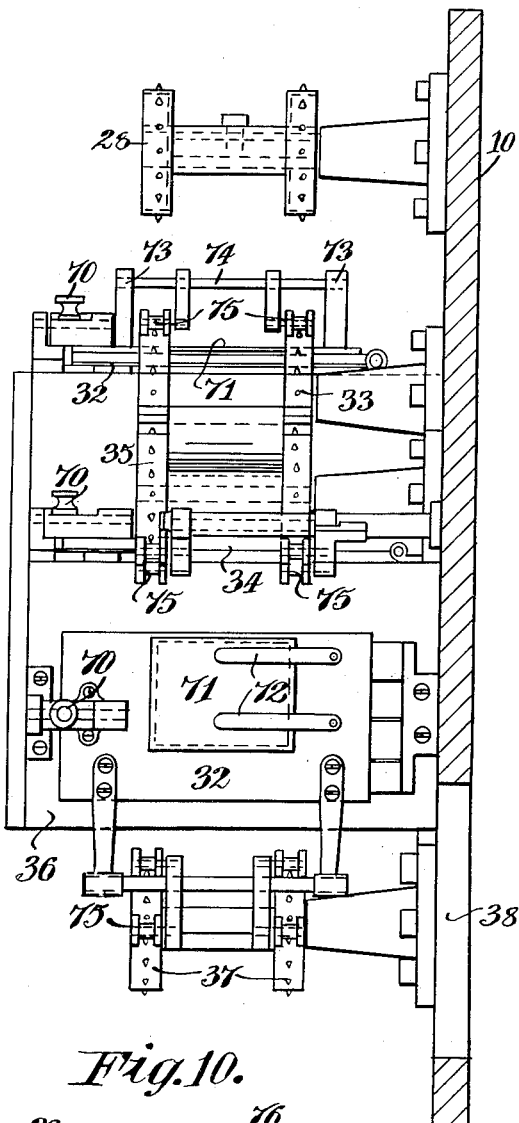
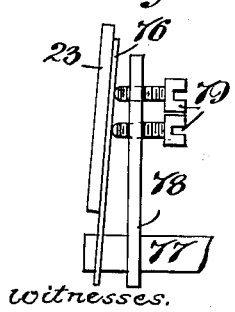
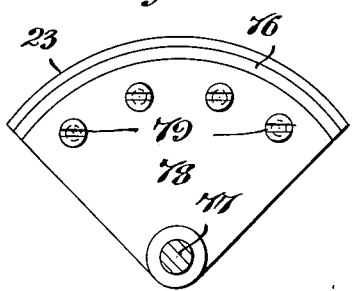
Witnesses.
G. Manning
C. W. Fowler
Inventor.
Donald Willson Player.
By T. Walter Fowler
atty.

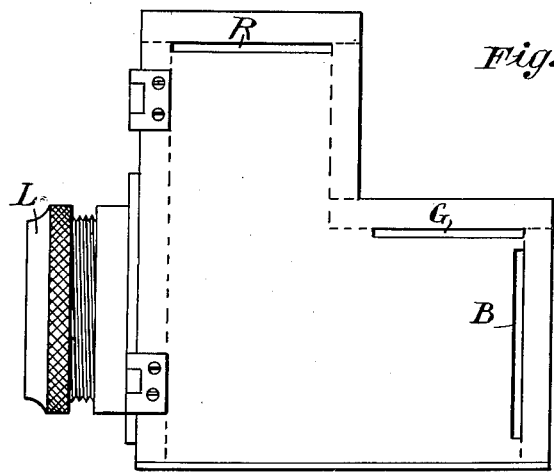
Fig.4.
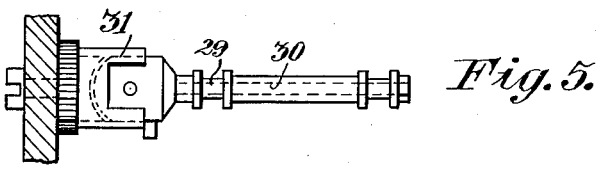
Fig.5.
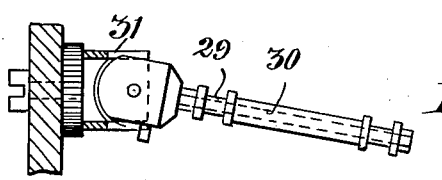
Fig.6.
Fig.7.
Fig.8.
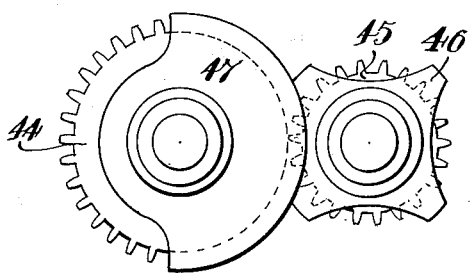
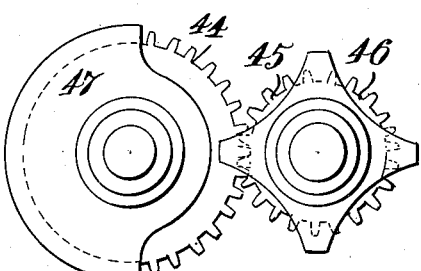
Inventor.
Donald Willson Player.
By T. Walter Fowler
atty.
Witnesses.
G. Manning
C W Fowler

UNITED STATES PATENT OFFICE.

DONALD WILLSON PLAYER, OF FOLKESTONE, ENGLAND.

MOVING-PICTURE APPARATUS.

1,253,883.  Specification of Letters Patent.  Patented Jan. 15, 1918.

Application filed August 25, 1914. Serial No. 858,465.

*To all whom it may concern:*

Be it known that DONALD WILLSON PLAYER, a subject of the King of England, residing at Folkestone, in the county of Kent, England, has invented certain new and useful Improvements in Moving-Picture Apparatus, of which the following is a specification.

This invention relates to the taking and reproduction of moving pictures and more particularly of moving pictures in natural colors.

In my prior patent specification Serial No. 798,475 I have described a method of and apparatus for taking and projecting moving pictures by means of rotating mirrors or reflectors which replace the usual shutter or shutters in such a way that two or more series are taken through the same lens, and during the changing movement of the film the light is cut off from that film and reflected upon another film which is at the moment stationary.

The present invention consists essentially of an improvement in apparatus employing rotating mirrors for such purposes, to enable the two or more series of pictures or records to be taken directly upon the same negative film. This may be effected by any suitable method known in the cinematograph art for securing alternate series upon a single length of film. I may for instance arrange for the single negative film to pass through both or all the positions to which the two or more sets of images are reflected, the impressions upon the complete film being registered successively at the different points while the respective portions of film are momentarily at rest. The film is advanced intermittently a portion at a time, each movement taking place during the time that the light is cut off from that portion of film. It will be understood that the order of the pictures upon the actual film will not necessarily be identical with the order of taking because for convenience the several series will start at intervals corresponding to the length of film between the positions of the several images.

The advance of the film may be effected by suitable mechanism of, for example, the roller type or Maltese cross type, or by a reciprocating slide or claw device actuated in synchronism with the rotating mirrors. In order to accommodate the variation in length of the portions of film between the positions of the images, intermediate loops of free film may be allowed or the film may be passed over suitable guide rollers which may be idle rollers or driven by feed-mechanism such as the intermittent sprockets of the type commonly employed in the cinematograph art.

The accompanying drawings represent by way of example an apparatus for the taking of moving pictures in accordance with the present invention.

Fig. 3 is a section on line A—A of Fig. 1 showing an end view of the gates and sprockets.

Fig. 4 shows the shape of the mirror chamber.

Figs. 5 and 6 show detail of a guide roller.

Figs. 7 and 8 show detail of the maltese cross gear movement.

Figs. 9 and 10 show detail of the adjustable mounting for the mirrors.

Figure 1:
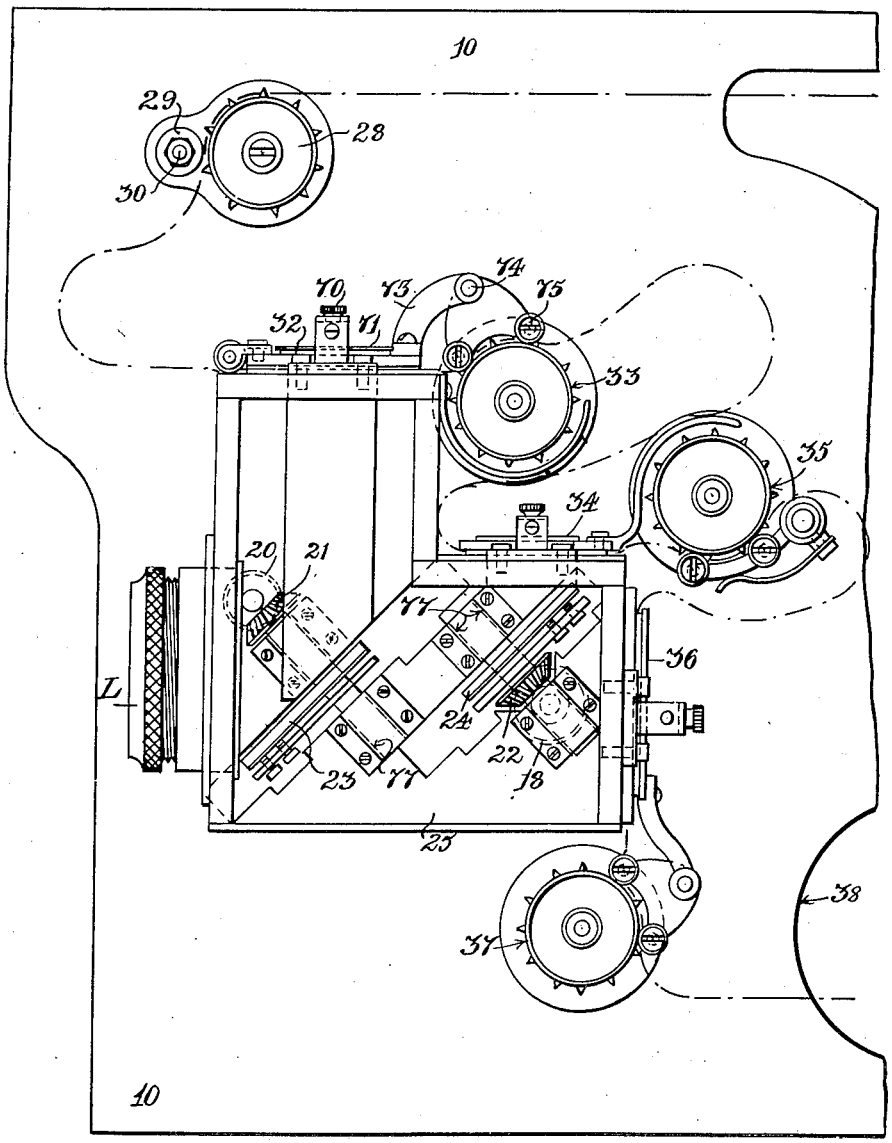
Figure 1 is an elevation of the apparatus removed from its case, the door of the mirror chamber being omitted.

As here shown the apparatus comprises a suitable plate or frame 10 which is adapted to be inclosed in a light-tight box or casing. A handle 12 projecting exteriorly of the casing actuates a large gear-wheel 13 which by means of a pinion 15 revolves a fly-wheel 16 at high speed so as to equalize the motion. The spindle of the fly-wheel carries also a gear-wheel 17 meshing with two wheels 18, 19 of which the latter in turn engages with a wheel 20. The wheels 18, 20 drive for example bevel wheels mounted on their shafts and meshing with wheels 21, 22 which drive the rotating mirrors 23, 24 (see Fig. 1). The two mirrors which are of sector-shape are arranged in parallel planes within the chamber 25, and they are adapted to intersect successively at angles of for example 45 degrees the illumination coming through the lens in the front of this chamber. The mirrors are mounted upon their spindles in such a manner that their inclination can be adjusted accurately to reflect the illumination upon the recording surfaces. As shown in Figs. 9 and 10, the mirror 23 is carried upon a spring steel plate or other elastic support 76 which is secured to the spindle 77 at a slight inclination, that is to say in a plane not at right angles to the axis of the spindle. A rigid backing plate 78, behind this elastic support, carries near its periphery a number of set screws 79, for example four at equally spaced intervals. By adjusting these set-screws the elastic support 76 can be forced back to or beyond the perpendicular position, or again by adjusting the screws toward one corner of the plate, the elastic support can be set or twisted around the central radius or axis of the sector. This arrangement therefore allows a very accurate adjustment of the reflecting surfaces, which is indeed necessary in order to obtain satisfactory results.

If it be desired to give equal exposures to the three sets of pictures, the rotating mirrors should be of sector shape occupying one-third of their respective circles. In practice, more particularly in color-picture work, it is nearly always necessary to give unequal exposures depending upon the particular color filters and the color-sensitiveness of the film used; this may be effected by varying the size of the sectors, for example I may make one mirror (23) ten per cent. more than one-third of its circle. Their spindles are so disposed that the illumination admitted through the lens, represented at L, will either strike one or other of these reflectors or pass clear of them in a straight line along the axis of the lens, according to the position given to the reflectors by the rotation of their operating gears. The light is thereby reflected vertically upward to one or other of the two film-positions at the top of the mirror-chamber, but while the mirrors are both clear of the line of light the rays pass directly to the film position at the rear end of the chamber. In the taking of moving pictures in colors, the division of the light is carried out in such a way that each of the color components is recorded on the series of pictures taken at one of the positions, suitable color screens of the known type being arranged for the filtering of the light.

According to the present invention, a single film is made to pass successively through the three positions and to receive at each point the impressions of one series of pictures, the film standing momentarily stationary at this point while it advances to the required extent at the other points.

For this purpose the film stored in a revoluble spool within the fixed drum 26, from which it passes out through a velvet-padded slit or opening 27, is drawn continuously forward by a feed roller 28, with the pins of which it is held in engagement by means of a guide roller 29 revolubly mounted on a pin 30. To facilitate the insertion or removal of the film at this point the pin 30 is preferably hinged to its support, as shown in Figs. 5 and 6, a sliding sleeve 31 being arranged to cover the hinged joint and so render the pin rigid in normal conditions. The film next passes loosely to the first film position, where it travels beneath a hinged gate 32. This gate is provided with a spring latch 70 which retains it in the normal closed position. A central panel 71 having a velvet or other covering on its inner face, is pressed by springs 72 against the back of the traveling film to hold the film against its guides and in the correct plane. From the side of the hinged gate there project two arms 73 which are connected by a cross bar 74 on which there are pivoted a pair of rocking arms carrying the guide-rollers 75 which keep the traveling film in engagement with a second feed-roller 33. This feed-roller 33, intermittently rotated to the extent of three picture-lengths, as hereafter described, draws the film forward through the gate to a second loose portion or loop, from which it travels periodically through a second gate 34 located at the second film-position on top of the mirror-chamber. The third feed-roller 35, also intermittently rotated, draws the film through the second gate and passes it to a third loop, from which it is drawn periodically through a third gate 36 by a feed roller 37, which is likewise rotated intermittently to the extent of three picture-lengths. From the feed roller 37 the film passes through a hole 38 in the base plate to the opposite side of the latter where it is taken up at uniform speed by a continuously revolving feed-roller 39, over which it is guided by rollers mounted on a hinged frame or gate 40, and from which it enters the drum 41 being therein wound upon a spool driven through a slipping clutch device in the known manner. Suitable color filters are inserted in front of the three film positions, for example through apertures R, G, B, as indicated in Fig. 4, so as to cause each series of pictures to record the impressions of one color-component.

Figure 2:
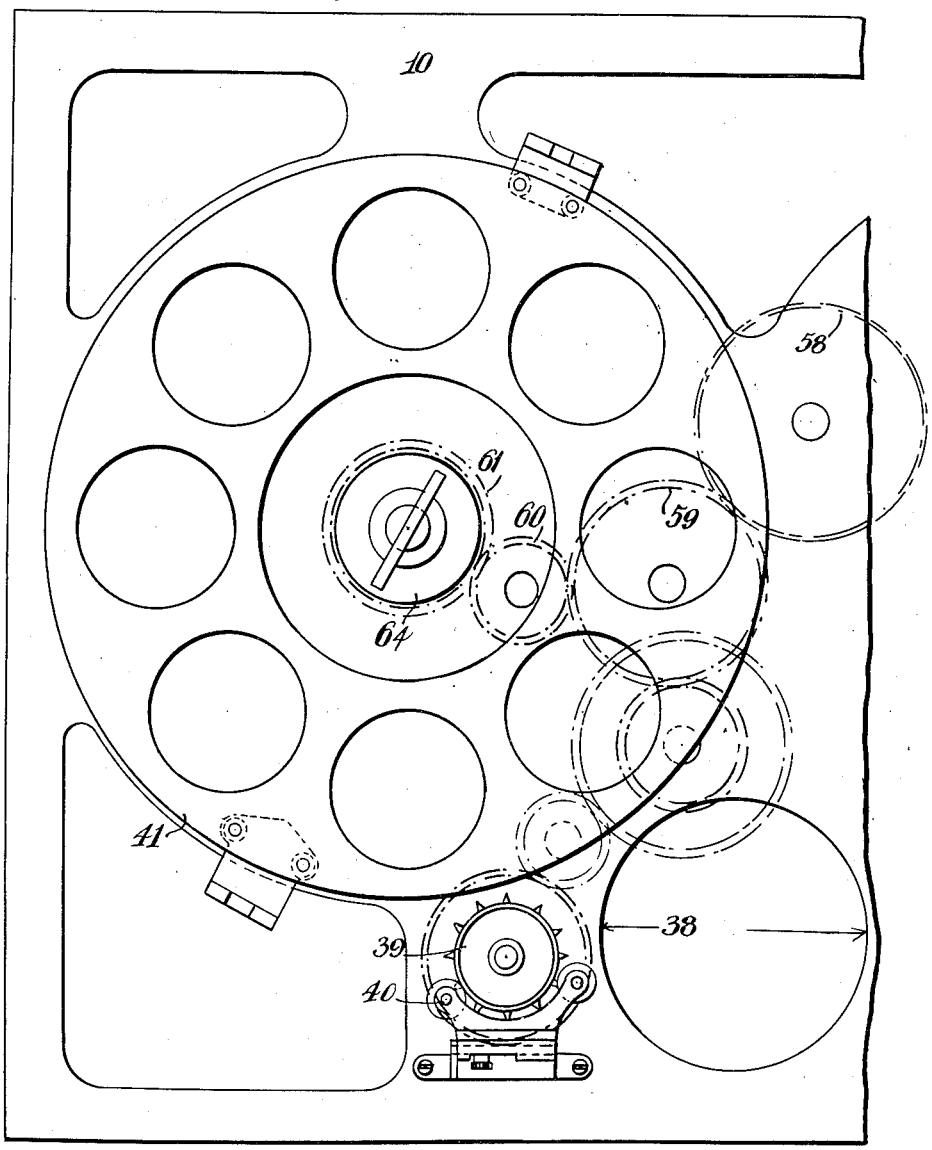
Fig. 2 is an elevation from the opposite side.

The method of operating the several feed rollers is shown in Fig. 2. The gear wheel 13 meshes on one side with a wheel 42, which itself engages a gear wheel 43 mounted on the first motion shaft of a Maltese-cross mechanism. This mechanism, shown on a larger scale in Figs. 7 and 8, comprises a mutilated gear wheel 44 meshing with a pinion 45 on the spindle of the cross 46, in addition to the cam 47 which directly engages the cross. In the example shown, the diameter of the mutilated gear 44 is one and a half times that of the pinion and its teeth extend over half its circumferences; consequently during one half revolution of the cam and mutilated gear the cross is held stationary, but during the other half revolution of the former the cross and feed-roller are rotated through three-quarters of a revolution, thereby advancing the film through three picture-lengths at this point. The relations mentioned may of course be varied if desired.

The gear shaft 13 also meshes with a wheel 48 secured upon the shaft 49 of a second mutilated gear 50 and cam 51 which operates a second Maltese-cross mechanism belonging to the feed roller 35. The feed roller 33 is likewise actuated by an intermittent mechanism through the gears 53, 54, 55, and the constantly revolving feed roller 28 is driven by the wheel 55 through the gears 56, 57.

It will be understood that the proportions of the various gear wheels are so arranged as to effect the desired movements of the three portions of the film at the correct times and in suitable relation to the rotation of the mirrors in the chamber 25, so that the latter reflect or pass the light to the respective film-positions at the moment when the film is stationary at each point.

The winding spool is shown as being driven by the gears 58, 59, 60, 61, the latter being secured to a flange 64 loose upon the spindle of the film spool but pressed by an adjustable spring against a similar flange secured thereon, so as to rotate the spool by the frictional engagement of the flanges.

It is to be observed that the film passing to the guide flaps or gates is not tensioned to any degree, but forms a loose length or loop which constitutes a reserve upon which the next of the advancing mechanisms can draw without risk of tearing the film. This arrangement is necessary because the feed-motions do not take place simulataneously but successively and in accordance with the setting of the feed rollers. These movements are effected during the intervals between the exposures at the three positions mentioned, corresponding to the direct illumination and the two reflected portions of the illumination, as determined by the rotating reflectors.

As mentioned above, the advance of the film at each position takes place to the length of three pictures; consequently after the first exposure the film has one out of every three pictures exposed and the intervening two-thirds unexposed. The setting of the feed mechanism is so arranged that the exposure at the second position takes place upon an intermediate space and the film has then two out of every three pictures exposed. The third exposure then takes place upon the remaining picture-space.

By reason of the lengths of film intervening between the three exposure positions, any three pictures taken in immediate succession will not be adjacent but separated by corresponding lengths upon the actual negative film. This need not affect the result provided suitable allowance is made for this fact in the subsequent operations.

The mirrors should be of a type which has only one reflecting surface such as plain polished silver or speculum metal or glass silvered upon the surface upon which the incident rays first fall.

If desired I may arrange as a precautionary measure and more particularly to avoid fogging of the unexposed portions of the film while passing idly through the gates, any desired means to exclude undesired light from the unexposed portions of the film, as well as to prevent subsequent veiling of the exposed portions of the film.

This apparatus for taking pictures in the form of the usual negatives can also be used for projecting positives printed from such negatives. In order to project the pictures from the negatives taken by the above described camera-projector apparatus I use corresponding apparatus constructed as above but with the necessary modifications.

When the single negative film has been produced, the positive film may be printed therefrom by any contact method, and projected by means of an apparatus similar in type but having means for providing the required illumination of the positive film. The three series of pictures must of course be synchronized with their order of taking, and if one series is reversed in relation to the other two, the projecting apparatus must be arranged to take account of this fact.

This invention will enable the single positive film to be obtained by direct printing from a single negative film in the ordinary manner.

Having thus described my invention what I claim as such and desire to secure by Letters Patent is:—

1. In moving picture apparatus, the combination with a mechanism for intermittently forwarding a film, of a rotatable reflector, and means for tilting the reflector about an axis at substantially right-angles to the axis of rotation, said tilting means comprising a rigid support and a companion elastic support, said supports being mounted on the axis of said reflector and said supports being inclined one relatively to the other, said reflector being mounted on said elastic support, and means on one of said supports engaging the other support for varying the inclination of one of said supports.

2. In moving picture apparatus, the combination of a rotatable reflector comprising means for tilting the reflector about an axis at substantially right-angles to the axis of rotation, and for tilting the reflector about a third axis at substantially right-angles to the said axes.

3. In moving picture apparatus, the combination with a plurality of guideways, of means for intermittently forwarding a single film in said guideways in cyclic succession, revoluble means to successively and cyclically transmit light in relation to said film, said revoluble means comprising a pair of supports arranged in spaced relation and adjustably inclined one relatively to the other, and means for fixing the inclined support in its adjusted position.

In testimony whereof I have affixed my signature in presence of two witnesses.

DONALD WILLSON PLAYER.

Witnesses:
VICTOR FALLON FEENY,
JOHN W. PATCHING.